June 8, 1965 G. S. WING 3,187,790
SCREW AND SCREW DRIVER COUPLING
Filed May 18, 1959 2 Sheets-Sheet 1
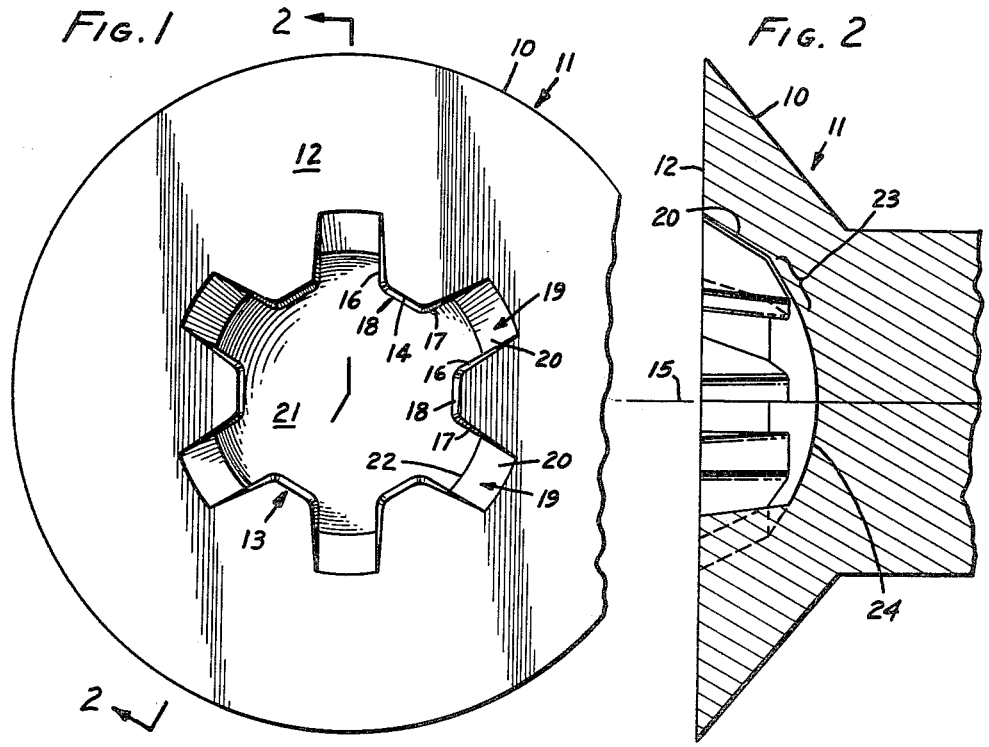
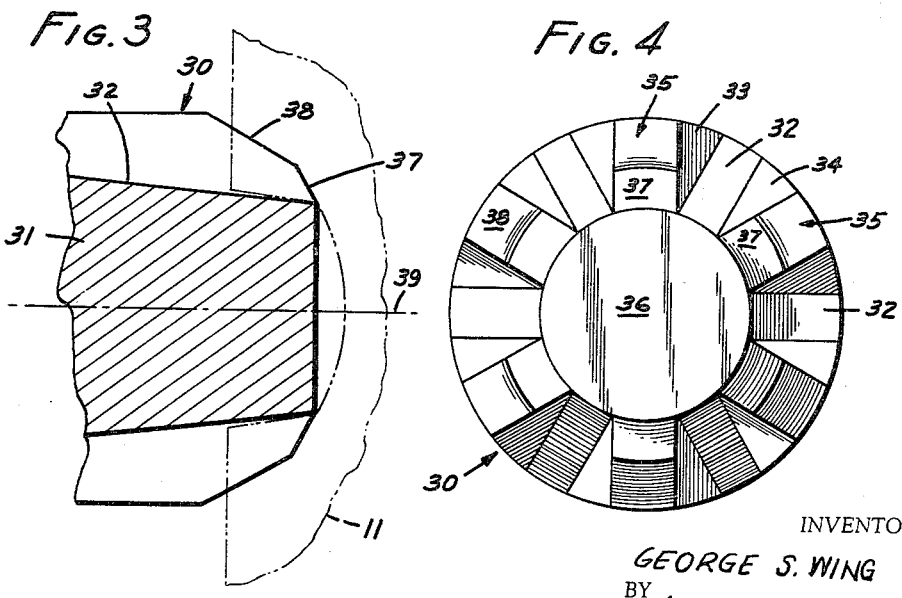
INVENTOR.
GEORGE S. WING
BY
Angus & Mow
ATTORNEYS June 8, 1965 G. S. WING 3,187,790
SCREW AND SCREW DRIVER COUPLING
Filed May 18, 1959 2 Sheets-Sheet 2
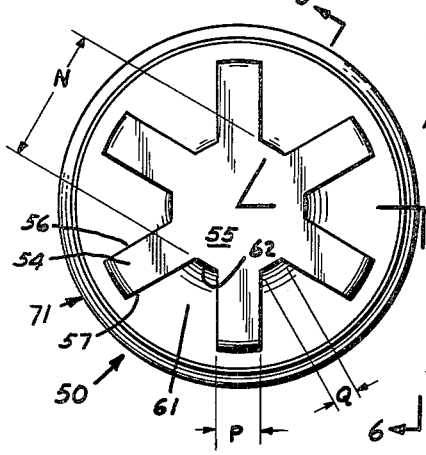
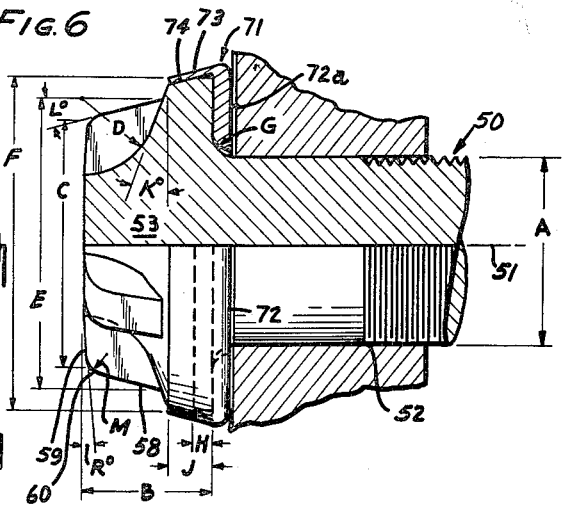
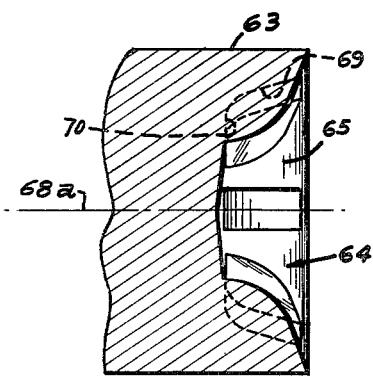
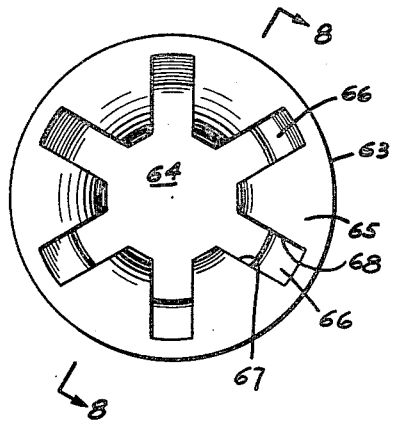
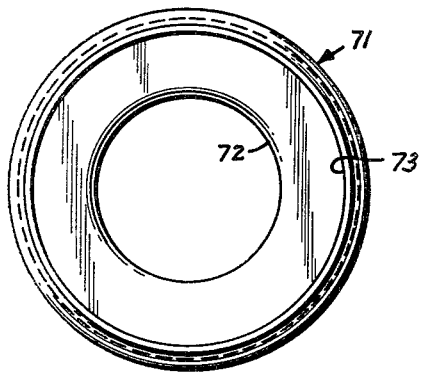
INVENTOR.
GEORGE S. WING
BY
ATTORNEYS.

3,187,790
SCREW AND SCREW DRIVER COUPLING
George S. Wing, Palos Verdes Estates, Calif., assignor to Hi-Shear Rivet Tool Company Torrance, Calif., a corporation of California
Filed May 18, 1959, Ser. No. 814,008
2 Claims. (Cl. 145—50)

This invention relates to a coupling suitable for torque-driving connection between elements such as a driver and a bolt or screw, for example.

This application is a continuation-in-part of applicant's co-pending patent application Serial No. 790,756, filed February 2, 1959, now abandoned, entitled "Recess."

An object of this invention is to provide a coupling of the type whose driving portions can be formed by a heading operation, instead of milling operations, and in which the bearing surfaces are so disposed and arranged that, when torque is applied, there is a negligible tendency for the elements to cam apart.

This invention is carried out by providing a recess on one element, and a convex surface on the other element, so that when the convex surfaces engage in the recess, a twisting action on one of the elements is transmitted to the other element.

According to one feature of this invention, the recess includes a plurality of projections, each of which is bounded by a pair of projection walls which lie in planes that are substantially parallel to the longitudinal axis of the fastener. Each pair of adjacent projections is separated by an intervening recessed flute. One wall of each of the adjacent projections forms a side wall for each flute, and the side walls of each flute are substantially parallel to each other. Each flute has an outer wall that is inclined at an angle to the longitudinal axis, approaching the axis as it goes deeper into the recess. Each flute also has a bottom surface which intersects the side walls and the outer walls, its intersections with the outer walls lying farther from the longitudinal axis than the portion of the adjacent projections nearest the longitudinal axis. Preferably, although not necessarily, there are six projections and six flutes in the recess.

According to still another feature of this invention, the convex surface includes a plurality of blade members, each of which has opposite sidewalls that are substantially parallel, and which are adapted to engage the walls of the projections, and an outer wall which is adapted to engage the outer wall of the respective projection.

A result of the above constructions is a coupling, the surfaces of which can be formed by a cold-heading operation, during which operation the grain in the material flows in an optimum pattern, and in which the convex surfaces and recess can be used on either element; that is, on the driver or on the object, such as a screw or bolt, as the manufacturer and user prefer.

An optional feature of this invention resides in a lubricated washer for standardizing certain forces which arise in the tightening down of threaded fasteners.

The above and other features of this invention will be fully understood from the following detailed description and the accompanying drawings, in which:

FIG. 1 is a plan view of a counter-sunk type bolt head having a recess according to this invention in its upper surface;

FIG. 2 is a cross-section at line 2—2 of FIG. 1;

FIG. 3 is a cross-section of one embodiment of a driver for engagement with the recess shown in FIGS. 1 and 2, with the recess of FIGS. 1 and 2 shown in phantom-line in engagement by the driver;

FIG. 4 is a right-hand end view of the driver of FIG. 3;

FIG. 5 is a plan view of a bolt head having convex surfaces thereon according to this invention;

FIG. 6 is a view, partly in elevation and partly in cross-section, taken at line 6—6 of FIG. 5;

FIG. 7 is a plan view of another modification of a recess according to the invention;

FIG. 8 is a cross-section taken at line 8—8 of FIG. 7; and

FIG. 9 is a plan view of a washer shown in FIGS. 5 and 6.

In FIG. 1 there is shown the countersink head 10 of a fastener 11. The fastener may be a bolt, screw, pin, or any other type of object which requires engagement surfaces for engaging a torque-applying tool, such as a driver, for example. It is to be understood that although this invention is disclosed in connection with a countersink head, any other type of head such as a flat head, fillister head, and the like, could be used, the type of head being of no importance to the shape of the recess. In fact, the recess is adaptable to use in a headless pin, if desired.

In the upper surface 12 of the head, there is formed a recess 13 according to the invention. Six projections 14 are integral with the head and project inwardly toward the longitudinal axis 15 of the fastener, which usually will coincide with the longitudinal axis of the fastener. Each projection is bounded by a pair of sidewalls 16, 17. These sidewalls lie in planes which are substantially parallel to the central axis of the fastener. It will be seen that in FIG. 1, the sidewalls are shown at a slight angularity to the longitudinal axis, but it is to be understood that this illustrates merely the draft required for a cold-heading operation, and is of the order of perhaps 1° at the most. It is shown solely for the purpose of illustrating all of the details of construction of the recess. For all practical purposes the sidewalls are parallel to the longitudinal axis.

Each projection at its inner end is bounded by an inner wall 18, which wall is preferably substantially planar and may conveniently lie at an angle of about 3° to the longitudinal axis, although it, too, could be made substantially parallel to the longitudinal axis, if desired.

The sidewalls of the projections also provide sidewalls for flutes 19. "Flutes" are defined as the arms of the recess which extend outwardly between the projections. The flutes have an outer wall 20 which may be planar, if desired, but most conveniently will be as shown, that is, substantially a fragment of a cone. The generator of this surface makes an acute angle with the longitudinal axis, and for reasons to be discussed more fully below, this angle is preferably 30° (60° included conical angle).

The bottom 21 of the recess intersects the outer wall of each flute at a line 22 which lies outwardly from the longitudinal axis beyond the intersection of the inner walls of the projection with the bottom. As can best be seen in FIG. 2, the bottom preferably has a short conical segment 23 (sometimes called the "outer bottom segment"), having a conical angle of about 120°, immediately adjacent to and intersecting with the outer wall 20. The central portion of the bottom is a spherical segment 24 (sometimes called the "inner bottom segment") to which the conical segment 23 is tangent. The segment 24 is not a complete hemisphere but is the upper portion of a hemisphere which includes the pole. In solid geometry this portion of a sphere is called a "spherical segment." The spherical segment is not essential to this invention, but it is preferable, because combined with the other surfaces it results in optimum grain flow in a cold-heading operation.

Convex surfaces for engagement in recess 13 are shown on a driver 30 in FIG. 3. In the body 31 of the driver there are formed six longitudinal grooves 32. These grooves may be formed by a milling cutter which has two opposite, frusto-conical faces, and a large diameter. The driver in FIGS. 3 and 4 is conveniently made by milling six slots into the exterior periphery of the body by the direct insertion of the milling cutter. This way it is not required to move the milling cutter axially along the driver. By using a cutter of significantly large diameter, each groove 32 is bounded by walls 33, 34 which are fragments of cones, and each pair of walls defines an arm 35. By appropriate positioning of the large grinding wheel, such that its center of rotation is axially about even with the tip of the driver, then portions of the walls 33 and 34 on each side of individual arms 35 are substantially flat and parallel to each other over the portion of the driver which is to be inserted into the recess. This a common method for making a driver.

Before the grooves are formed, the tip of the driver is ground with a flat end 36. The end could, of course, be rounded off with a spherical tip to fit exactly the spherical segment 24 of the fastener. An external conical segment 37 is also ground which preferably has a conical angle of about 120°. An outer wall engagement sector 38 is also ground which, before the grooves are cut, is a cone with a 60° included conical angle; that is, the sectors 38 lie at an angle of 30° to the longitudinal axis 39 of the driver.

After the grooves are cut, the driver is as shown in FIG. 4. It will be noted that this end view, walls 33 and 34 which bound individual grooves, appear to converge toward each other. This is merely a showing of their frusto-conical shape. The bottom of the groove has a constant width. Bearing in mind the relationship of the diameter of the milling cutter which formed the grooves, it will be understood that the portion of the bounding walls 33, 34 which bound a particular arm 35 will be substantially parallel to each other and sensibly planar, lying parallel to the axis of the driver at the driver portion which is to engage the recess.

It will be understood that instead of the technique described above for forming the driver in FIGS. 3 and 4, it would be equally possible to form the grooves and arms by simply utilizing a cutter having frusto-conical portions on each side and passing it axially along the surface of the body after the body has had segment 37 and sectors 38 ground thereon. Then the surfaces formed would be completely planar over the portion milled when the cutter was moved axially and this would, of course, include the tip end portion of the driver.

FIGS. 5 and 6 illustrate a bolt 50 which has a central axis 51, a threaded shank 52 and a head 53, the head having convex surfaces thereon in accordance with the presently preferred embodiment of the invention. While these surfaces are shown on the head of a bolt, it is to be understood that they are useful on any other type of element which requires a coupling action for transmitting torque, such as a screw, as a further example.

The head has six convex blades 54 which radiate outwardly from a central section 55. The central section may be made flat as shown, or may be given a slight convex dome-like curvature, whichever is more convenient in the manufacture of the device. It merely needs to be sufficiently "shallow" that it does not prevent the blades from making full contact with the recess. Thus, when the blades make contact, the central surface should either just abut the bottom of the recess, or be somewhat spaced therefrom. The blades are bounded by substantially parallel sidewalls 56, 57, which terminate at an outer wall 58 and an end wall 59. Walls 58 and 59 intersect in a smooth curve 60.

Between the members of each pair of adjacent blades there is a groove 61. The groove is bounded by the sidewalls of the adjacent blades, and its bottom 62 is preferably a cylindrical arc.

Bolt 50 with its blades constitutes one element of a pair of elements which can be coupled so that they can transmit torque to one another. The other element of the pair is driver 63 shown in FIGS. 7 and 8.

Driver 63 has a recess 64 in its end, which recess includes surfaces which can engage with the sidewalls, outer wall and end wall of the blade.

The recess has a bell-mouthed opening, with a toroidal surface 65 which is shaped so as to make surface engagement with the bottoms 62 of the grooves in the bolt head. Flutes 66 extend radially outward from surface 65. They have sidewalls 67, 68 which are substantially parallel to each other and to central axis 68a of the driver, an outer wall 69, and a bottom wall 70. Walls 69 and 70 are oppositely inclined from walls 58 and 59 in the bolt head, so that they can make a continuous surface engagement with them.

Sidewalls 67 and 68 are spaced apart by substantially the same distance as sidewalls 56 and 57, the difference being just enough to assure the blades of entry into the flutes.

FIGS. 2 and 4 illustrate the use of a recess in a threaded element, and convex surfaces on a driver to form a coupling. FIGS. 6 and 8 illustrate the reverse, wherein the convex surfaces are on a threaded element, and a recess is in the driver. It will thereby be appreciated that the recess and convex surfaces disclosed in this specification may be placed on either the driver or the driven element, as desired.

FIGS. 6 and 9 illustrate the use of a threaded washer 71 with the driven element, in this case bolt 50. The washer has a flat annular base 72 that lies normal to the bolt axis, and an overhanging flange 73. The base abuts the underside of the bolt head, and the flange embraces a tapered side surface 74 of the head.

A problem which frequently arises in torquing down threaded fasteners resides in the variations of the reaction force between the workpiece and the portion of the fastener which is brought to bear against the workpiece, for example, between the head of a bolt and the workpiece, or between a nut and a workpiece. This reaction force may vary greatly from installation to installation depending on the surface finish, cleanliness, and other factors which influence friction and are difficult to control.

Because of the variations in reaction force occasioned by variation in friction forces developed between parts of the fastener and the workpiece when the fastener is tightened down, torque exerted on the fastener element may be correctly indicated by a torque wrench, but the axial pre-stress actually developed in the fastener element might not be directly proportional to the torque indication. One of the purposes of exerting control to torques or fasteners is to develop a calculated axial pre-stress in the fastener element, because this pre-stress exerts a clamping action which makes for a tight joint. An object of this invention is to provide means for developing a uniform and predictable pre-stress by applying a known and measured torque. This is accomplished by standardizing the coefficient of friction between the workpiece and the portion of the fastener which is drawn against it. If this reaction force is maintained at a standard level, then a correct axial pre-load can be obtained, because then the two physical forces which primarily determine it (torque and friction reaction force) are under control.

The above problems are solved in this invention by providing a layer of substantially dry lubricant 72a on one of the annular surfaces of base 72. Layer 72a is actually very thin, and is shown in FIG. 6 with an exaggerated thickness for purposes of illustration. In practice, both flat annular surfaces will be coated, and also the overhanging flange, because coating is most conveniently accomplished by dipping. However, only one (and either one) of said flat annular surfaces is enough to accomplish the object.

The presently-preferred type of lubricant is a polar wax compound, which is substantially dry. One example of this type of compound is sold by S. C. Johnson & Son, Inc., located at Racine, Wisconsin, under the name #153 Wax Lubricant "Tube Draw." This lubricant is provided in an evaporable liquid base. The base evaporates before the lubricant is used as described below, leaving the dry wax. A polarized lubricant has been found to be most useful, inasmuch as it is very difficult to remove from a surface. Once the above liquid compound has dried, the wax remaining on the treated surface can be removed only by using a strong solvent. There are other suitable dry lubricants that may be baked on or applied electrolytically, or chemical lubricants such as molybdenum disulphide, but the polar wax is preferable by reason of cost and convenience.

The above-described coupling has many important advantages, one of which is the readiness with which both the recess and the convex surfaces can be formed by a heading operation, often a cold-heading operation. The manufacture of recesses of this complexity by heading has heretofore been impractical and has had to be accomplished by machining it. In particular, it has heretofore been impractical to manufacture recesses of the complexity shown by cold-heading.

An advantage of this invention resides in the fact that each blade sidewall and recess projection sidewall has a substantial area, and the coupling provides six of such abutting areas for driving in either direction. Such a coupling is able to withstand considerable torque without galling or other failure.

Another advantage resides in the fact that the bearing area of the sidewalls of flutes and blades is substantially parallel to the longitudinal axis, and this parallelism to the axis minimizes and substantially eliminates any tendency of the driver to cam out of the recess when torque is applied.

A still further advantage will be noted from a comparison of the recesses shown with standard recesses. In this recess, a large bearing area for receiving the driver is provided in a comparatively shallow recess. Observe in FIG. 2 that the recess penetration does not have to go below the junction of the standard countersink head and the shank. It is a common situation in conventional recesses for the recess to go beyond this intersection, thereby reducing the cross-section of the bolt at this point, and reducing the shear strength of the bolt. By utilizing the recess of FIGS. 1 or 7, the shank has its full cross-section all the way from the intersection with the head to its unheaded end.

The shallowness of this recess is further advantageous because the tensile strength of an element is diminished by cutting away the material of the head. This recess requires only a minimum void.

In the recesses shown, the shallow bottom, and the particular slopes on the outer and bottom walls are ideal shapes for the flow of metal.

The particular recess shape facilitates obtaining a circular head on an element where a head is to be formed, because there is a more uniform flow of material than is attainable, for example, by the use of cruciform recess shapes. With this recess there can, of course, be provided more or less than six flutes and projections. However, six flutes and projections as shown have been found to be most advantageous.

As a particular example, certain dimensions are given herewith which have provided for an optimum recess for a 5/16" bolt in the recess embodiment of FIG. 1:
Diameter between bottoms of opposite outer walls: 0.252".
Diameter between bottoms of inner walls of opposite projections: 0.190".
Width of bottom of flutes at bottom of sidewalls: 0.060".
Depth from top of recess to upper edge of spherical segment: 0.082".
Diameter between upper edges of outer walls of flutes: 0.328".
Width of inner end of projections: 0.040".
Radius of spherical segment: 0.187".

The following is a table of suitable dimensions for head and convex surfaces shown in FIGS. 5 and 6:

| A | B | C | D | E | F | G | H |
|---|---|---|---|---|---|---|---|
| 0.311–0.312 | 0.200 | 0.385 | 0.125 | 0.450 | 0.526 | 0.031–0.041 | 0.030 |
| J | K | L | M | N | P | Q | R |
| 0.072 | 20° | 15° | 0.06 | 0.208–0.210 | 0.069 | 0.040 | 5° |

This invention thus provides a coupling with a recess and a mating element having corresponding surfaces with large bearing areas and optimum properties for being formed by a heading operation, and having optimum tension and shear properties. Because of the substantial bearing surfaces, the coupling provides means for torque-driving of a fastener that is capable of withstanding very high driving torques in comparison with other recesses, and is still one which can be manufactured by simple and inexpensive heading means.

The embodiment of FIGS. 5 and 6 is especially desirable when a strong head is needed. In this embodiment, no recess is formed; all bearing surfaces lie outside the major portion of the head and, because of the geometry of the surfaces, the projections do not extend very far out from the head. Thus, a strong torque connection can be attained by an easily formed head with relatively small projections.

This invention is not to be limited by the embodiment shown in the drawings and described in the description which is given by way of example and not of limitation, but only in accordance with the scope of the appended claims.

I claim:
1. A coupling for joining two elements with their central axes aligned so that turning one element around its central axis will turn the other element, said coupling comprising a recess on an end of one element and mating convex surfaces on the other of said elements adapted to enter into and engage with said recess, said recess comprising a plurality of projections, each projection being bounded by a pair of projection sidewalls which lie in planes that are substantially parallel to said central axis, each pair of adjacent projections being separated by an intervening flute, the sidewall of each adjacent projection forming a sidewall of each flute, the sidewalls of each flute thereby being substantially parallel, an outer wall partially bounding each flute, each outer wall lying at approximately 30° to the central axis; an outer bottom segment which is a fragment of a cone partially bounding each flute, each outer bottom segment lying at approximately 60° to the central axis, each outer bottom segment and its respective outer wall meeting at an intersection; the said intersection lying farther from the central axis than the portion of the adjacent projections nearest the central axis, said outer wall diverging outwardly from the said intersection and the longitudinal axis, an inner bottom segment which is a fragment of a sphere in the form of a surface of revolution developed around the central axis and concave, the outer bottom segment being substantially tangent to the inner bottom segment where they meet, the inner bottom segments lying closer to the central axis than the outer bottom segments, said convex surfaces comprising a plurality of radially extending blades, each of said blades having a pair of sidewalls which are substantially parallel to each other and to the central axis, and which are spaced apart by substantially the same distance that the sidewalls of the flutes are spaced apart, each blade also having an outer wall and an end wall which bear the same angular relation to the central axis as the respective outer wall and bottom surface of the flutes, the outer walls and end walls of the convex surfaces being substantially and respectively congruent to and adapted to make full surface contact with portions of the outer walls and bottom surfaces of the recess, whereby the blades are adapted to enter into the flutes with the respective sidewalls in engagement for effecting a torque driving connection between the two elements and with the elements held in alignment by the engagement of the outer walls and bottom surfaces of the recess with the outer walls and end walls of the convex surfaces.

2. A coupling for joining two elements with their central axes aligned so that turning one element around its central axis will turn the other element, said coupling comprising a recess on an end of one element and mating convex surfaces on the other of said elements adapted to enter into and engage with said recess, said recess comprising a plurality of projections, each projection being bounded by a pair of projection sidewalls which lie in planes that are substantially parallel to said central axis, each pair of adjacent projections being separated by an intervening flute, the sidewall of each adjacent projection forming a sidewall of each flute, the sidewalls of each flute thereby being substantially parallel, an outer wall partially bounding each flute, each outer wall lying at approximately 30° to the central axis; an outer bottom segment which is a fragment of a cone partially bounding each flute, each outer bottom segment lying at approximately 60° to the central axis, each outer bottom segment and its respective outer wall meeting at an intersection; the said intersection lying farther from the central axis than the portion of the adjacent projections nearest the central axis, said outer wall diverging outwardly from the said intersection and the longitudinal axis, an inner bottom segment which is a spherical segment of a sphere centered on the central axis and concave, the outer bottom segment being substantially tangent to the inner bottom segment where they meet, the inner bottom segments lying closer to the central axis than the outer bottom segments, said convex surfaces comprising a plurality of radially extending blades, each of said blades having a pair of sidewalls which are substantially parallel to each other and to the central axis, and which are spaced apart by substantially the same distance that the sidewalls of the flutes are spaced apart, each blade also having an outer wall and an end wall which bear the same angular relation to the central axis as the respective outer wall and bottom surface of the flutes, the outer walls and end walls of the convex surfaces being substantially and respectively congruent to and adapted to make full surface contact with portions of the outer walls and bottom surfaces of the recess, whereby the blades are adapted to enter into the flutes with the respective sidewalls in engagement for effecting a torque driving connection between the two elements and with the elements held in alignment by the engagement of the outer walls and bottom surfaces of the recess with the outer walls and end walls of the convex surface.

References Cited by the Examiner

UNITED STATES PATENTS

| | | | |
|---|---|---|---|
| 1,295,937 | 3/19 | Stafford et al. | 85—9 |
| 2,216,382 | 10/40 | West et al. | |
| 2,285,461 | 6/42 | Purtell | 85—45 |
| 2,369,853 | 2/45 | Purtell. | |
| 2,417,225 | 3/47 | West et al. | |
| 2,474,994 | 7/49 | Tomalis | 85—45 |
| 2,507,231 | 5/50 | Tomalis. | |
| 2,760,400 | 8/56 | Mills et al. | 85—9 |
| 2,764,197 | 9/56 | Torresen. | |
| 2,847,894 | 8/58 | Smith et al. | |
| 2,848,024 | 8/58 | Smith et al. | |

FOREIGN PATENTS 542,213   11/55   Belgium.

WILLIAM FELDMAN, *Primary Examiner.*

MORRIS M. FRITZ, *Examiner.*